June 2, 1953

A. JOHNSON 2,640,655

UNIFORM TENSIONING DEVICE

Filed April 28, 1949

INVENTOR.
ALBERT JOHNSON
BY
Clark & Utt
ATTORNEYS

June 2, 1953  A. JOHNSON  2,640,655
UNIFORM TENSIONING DEVICE
Filed April 28, 1949  2 Sheets-Sheet 2
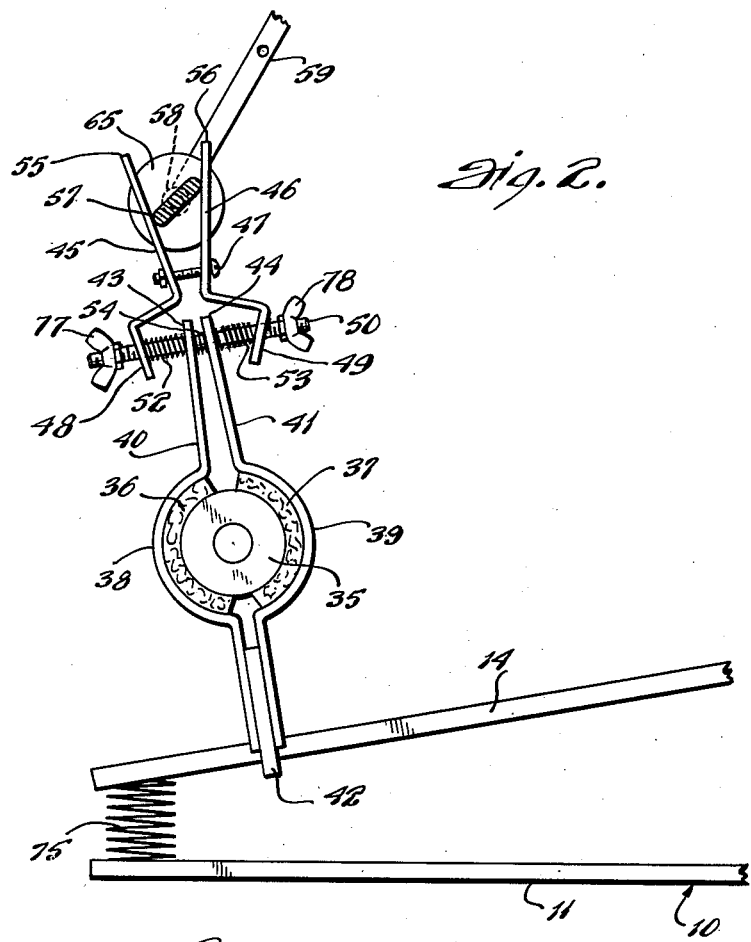
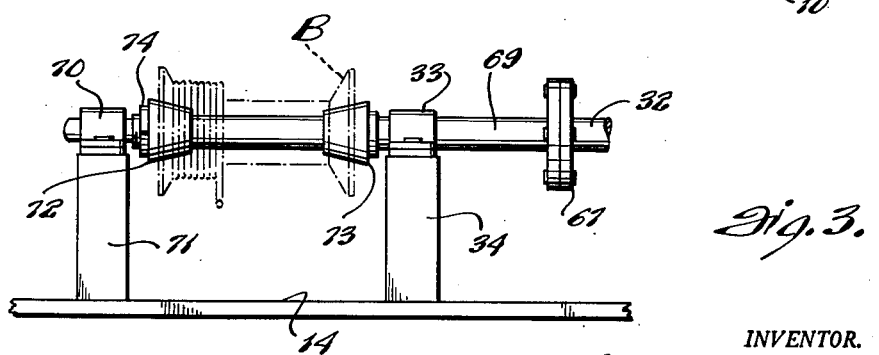
INVENTOR.
ALBERT JOHNSON
BY
Clark & Ott
ATTORNEYS Patented June 2, 1953

2,640,655

UNITED STATES PATENT OFFICE 2,640,655

UNIFORM TENSIONING DEVICE

Albert Johnson, New York, N. Y.

Application April 28, 1949, Serial No. 90,143

3 Claims. (Cl. 242—45)

This invention relates to a device for automatically maintaining a uniform tension on a strand of wire, thread and the like as the same is unwound from a spool or reel.

As the spools or reels vary in weight as well as in the quantity of material wound thereon, uneven tension in the take off of the material results unless provision is made for automatically producing a braking action on the spool or reel in relation to the weight of the spool or reel and the material thereon. The invention therefore comprehends an improved device whereby substantially the same tension or pull on the strand is required to effect rotation of the spool or reel irrespective of the weight thereof or of the quantity of material wound thereon.

Another object of the invention is to provide a tensioning device mounted on a resiliently supported base which is movable for subjecting the spool or reel to a braking action in relation to the weight of the spool or reel and the material wound thereon.

Another object of the invention is the provision of means for automatically decreasing the braking action on the spool or reel shaft as the base swings upwardly with the take off of the material on the spool or reel.

Still another object of the invention is to provide a tensioning device of the indicated character in which means is provided for varying the resiliency of the base for accommodating different sizes of spools or reels.

With the foregoing and other objects in view, reference is now made to the following specification and accompanying drawings in which the preferred embodiment of the invention is illustrated.

In the drawings:

Fig. 2 is an enlarged fragmentary view showing the brake arms moved inwardly so as to tension the brake shoes against the brake drum when the platform is swung downwardly by the weight of the spool or reel.

Fig. 3 is a fragmentary end view showing the support for the shaft for mounting a large spool or reel.

Figure 1:
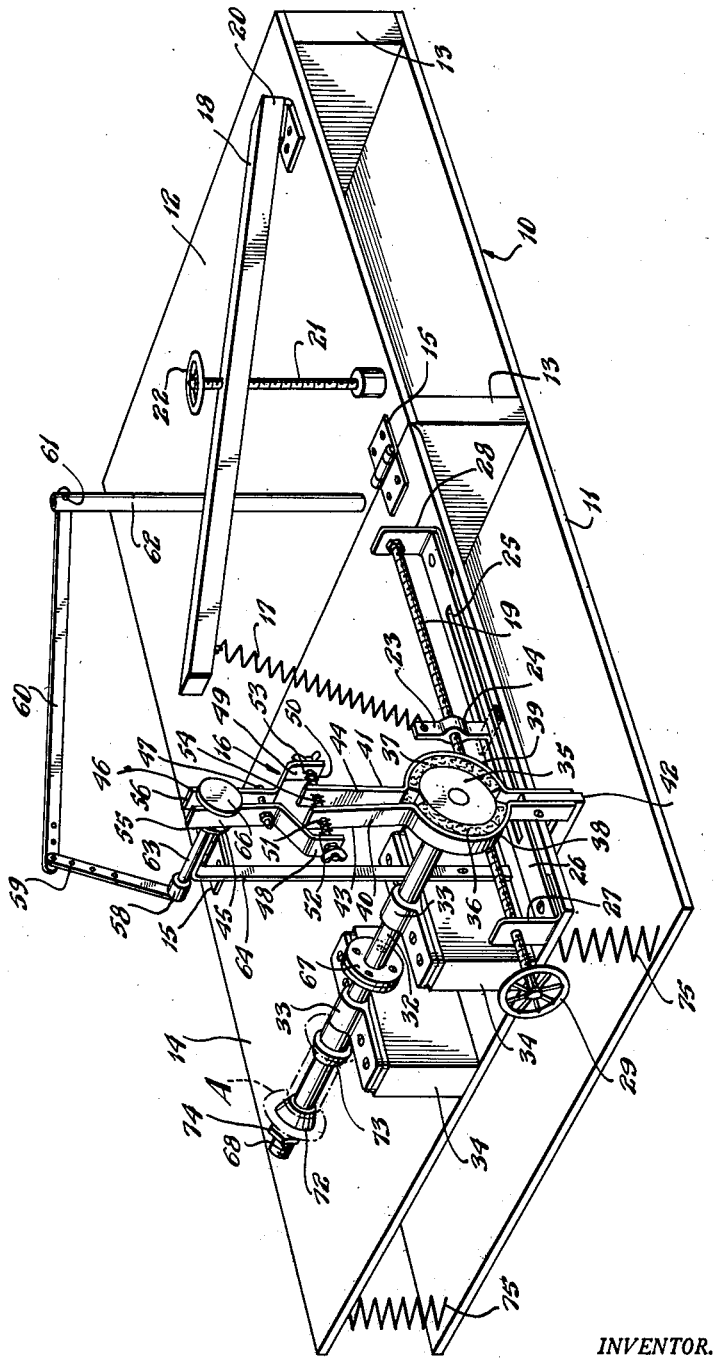
Fig. 1 is a perspective view of a uniform tensioning device constructed in accordance with the invention.

Referring to the drawings by characters of reference, the tensioning device includes a base 10 of stepped formation consisting of a bottom wall 11 and an upper wall 12 supported above the rear portion of the bottom wall by transversely extending members 13. Disposed in overlying relation with the forward end of the bottom wall 11 is a platform 14 which is connected with the upper wall 12 by hinges 15 and which forms a support for the tensioning means indicated generally by the reference character 16.

The platform 14 is resiliently supported for swinging movement from a substantially horizontal position to an inclined relation by a coil spring 17 connected at its upper end to an arm 18 projecting forwardly from the upper wall 12 of the base and connected at its lower end to an adjusting screw 19 carried by the platform 14. The arm 18 is hinged at its lower end 20 to the upper wall 12 and projects forwardly therefrom in inclined relation. The said arm is adapted to be adjusted for varying the inclination thereof in order to vary the tension on the spring 17 by a screw 21 secured to the upper wall 12 for swivel turning movement and which screw threadedly engages through the arm 18 and is provided with a hand wheel 22 at its upper end for manually turning the same. The tension on the coil spring 17 is also adapted to be varied by movement of a rider 23 threadedly engaged on the screw 19 and to which the lower end of the coil spring is attached. The rider 23 is provided with a depending flanged projection 24 which is guidedly mounted in a guide slot 25 in a plate 26 secured to the upper face of the platform 14 with the flanges thereof extending under the plate 26. The screw 19 is swivelly mounted in the angulated ends 27 and 28 of the plate 26 with the forward end of the screw protruding through the end 27 and provided with a manipulating handle 29.

The tensioning means 16 includes a shaft 32 on which a spool or reel indicated by the reference character A is mounted for turning movement for taking off wire, thread or the like wound thereon. The shaft 32 extends transversely of the platform 14 and is journaled in bearings 33 mounted on blocks 34 affixed to the platform adjacent the forward edge thereof. Arranged on the free outer end of the shaft is a brake drum 35 having a cylindrical periphery adapted to be engaged by oppositely disposed arcuate brake shoes 36 and 37 for producing a braking action on the shaft. The brake shoes 36 and 37 are arranged within oppositely disposed arcuate portions 38 and 39 of brake arms 40 and 41 affixed at their lower ends to an angle bracket 42 secured to the platform 14 with the upwardly projecting oppositely disposed parallel ends 43 and 44 of said brake arms disposed in spaced relation and adapted to be moved toward and away from each other for varying the tension of the brake shoes against the periphery of the brake drum.

In order to move the brake arms 40 and 41 toward and away from each other for varying the braking action on the shaft 32, rock arms 45 and 46 are provided which are secured together intermediate their ends for pivotal rocking movement by a screw 47 extending therethrough medially of the length thereof. Below said pivotal connection the rock arms extend outwardly and have downwardly extending terminals 48 and 49 at their lower ends through which protrudes a screw 50 slidably mounted in aligned openings 51 in the ends 43 and 44 of the brake arms. Coil springs 52 and 53 are arranged on said screw between the terminals 48 and 49 and the ends 43 and 44 of the brake arms respectively. Wing nuts 77 and 78 threadedly engaging the ends of the screw 50 retain the downwardly extending terminals 48 and 49 on the screw and may be tightened thereagainst to vary the tension of the coil springs 52 and 53. A coil spring 54 is also arranged on said screw between the ends 43 and 44 of the brake arms for normally maintaining the said arms in resiliently spaced relation. The rock arms also include upwardly projecting ends 55 and 56 which are disposed on opposite sides of a cam 57 mounted on a rock shaft 58 rigidly affixed at its inner end to an arm 59. The arm 59 is pivotally attached to a bar 60 pivoted as at 61 to the upper end of a standard 62 mounted in upright relation on the base 10 adjacent the forward edge of the upper wall 12.

The rock shaft 58 is mounted for rocking movement in a horizontal bearing 63 arranged on the upper end of a standard 64 affixed at its lower end to one of the blocks 34. Arranged on the rock shaft 58 are spaced circular heads 65 and 66 located at opposite ends of the cam 57 and between which heads the upper ends 55 and 56 of the rock arms 45 and 46 are disposed in engagement with the cam 57. The heads 65 and 66 constitute guides for retaining the upper ends 55 and 56 of the rock arms in alignment on opposite sides of the cam.

The shaft 32 is flanged as at 67 between the spaced bearings 33 which permits of the replacement of the outer end 68 of said shaft and the substitution of a shaft end 69 as shown in Fig. 3 of the drawings. The shaft end 69 is supported at its outer end in a bearing 70 mounted on a replaceable block 71 for accommodating a large or heavy spool or reel indicated by the reference character B, which with the material wound thereon may weigh several hundred pounds. The spools or reels A and B are secured on the shaft ends 68 and 69 respectively by conical shaped wedges 72 and 73 slidably fitted on said shaft ends and which are tightened in the bore or axle of the spool or reel by nuts 74 which also secure the spool or reel to the shaft.

The platform 14 may also be resiliently supported by springs 75 arranged between the platform and the base adjacent the forward end thereof. Said springs are particularly important when heavy spools are employed as shown in Fig. 3 of the drawings while the tension on the platform 14 by the coil spring 17 is adapted to be varied so as to vary the braking action of the brake shoes against the brake drum. The platform 14 is thereby balanced and moves downwardly with the weight of the spool thereon so as to move the rock arms to thereby move the brake arms to exert pressure of the brake shoes against said drum in relation to the weight of the spool imposed on the platform. As the strand is unwound from the spool, the platform will rise and the braking action on the shaft will decrease.

What is claimed is:

1. In a device for tensioning the unwinding of a strand from a spool, a base, a platform balanced on said base and having upward movement, a shaft rotatably supported on said platform and adapted to receive a spool for turning the shaft by the unwinding of the strand therefrom, brake shoes, oppositely disposed brake arms carried by said platform and having resiliently spaced ends and mounting said shoes for braking action on the shaft, oppositely disposed rock arms carried by said spaced ends of the brake arms, resilient means arranged between said spaced ends of the brake arms for exerting an outward tension on the brake arms and resilient means arranged between said spaced ends and the rock arms for exerting inward tension on the brake arms by inward movement of the rock arms, a second rotatable shaft supported by said platform and having a cam arranged between said rock arms for moving the rock arms to vary the tension of said resilient means on said brake arms, and a lever affixed to said second mentioned shaft and pivotally supported at its opposite end by said base for rotating said shaft with the movement of the platform to thereby exert braking action of the shoes on the shaft in relation to the weight of the spool supported on the platform.

2. In a device for tensioning the unwinding of a strand from a spool, a base, a platform balanced on said base and having upward movement, a shaft rotatably supported on said platform and adapted to receive a spool for turning the shaft by the unwinding of the strand therefrom, brake shoes, oppositely disposed brake arms carried by said platform and having spaced ends and mounting said shoes for braking action on the shaft, oppositely disposed rock arms connected together for pivotal rocking movement and adjustably carried by the spaced ends of the brake arms, resilient means arranged between said spaced ends of the brake arms for exerting an outward tension on the brake arms and resilient means arranged between said spaced ends and the rock arms for exerting inward tension on the brake arms by inward movement of the rock arms, a second rotatable shaft supported by said platform and having a cam arranged between said rock arms for moving the rock arms to vary the tension of said resilient means on said brake arms, a lever affixed to said second mentioned shaft and pivotally supported at its opposite end by said base for rotating said shaft with the movement of the platform to thereby exert braking action of the shoes on the shaft in relation to the weight of the spool supported on the platform, and means engaging said rock arms for adjusting the tension of said resilient means against the brake arms.

3. In a device for tensioning the unwinding of a strand from a spool, a base, a platform balanced on said base and having upward movement, a shaft rotatably supported on said platform and adapted to receive a spool for turning the shaft by the unwinding of the strand therefrom, brake shoes, oppositely disposed brake arms carried by said platform and having spaced ends and mounting said shoes for braking action on the shaft, a bar slidably disposed in openings in said spaced ends, oppositely disposed rock arms connected together for pivotal rocking movement and slidably arranged on said bar, resilient means arranged between said spaced ends of the brake arms for exerting an outward tension on the brake arms and resilient means arranged between said spaced ends and the rock arms for exerting inward tension on the brake arms by inward movement of the rock arms, a second rotatable shaft supported by said platform and having a cam arranged between said rock arms for moving the rock arms to vary the tension of said resilient means on said brake arms, a lever affixed to said second mentioned shaft and pivotally supported at its opposite end by said base for rotating said shaft with the movement of the platform to thereby exert braking action of the shoes on the shaft in relation to the weight of the spool supported on the platform, and means adjustably securing said rock arms on said bar for varying the tension of said resilient means against said spaced ends.

ALBERT JOHNSON.

References Cited in the file of this patent

UNITED STATES PATENTS

| Number | Name | Date |
|---|---|---|
| 648,273 | Lindstrom | Apr. 24, 1900 |
| 793,929 | Harrington | July 4, 1905 |
| 857,272 | Enrico | June 18, 1907 |
| 925,304 | Cummings | June 15, 1909 |
| 993,550 | Robeson | May 30, 1911 |
| 1,459,304 | Huff | June 19, 1923 |